United States Patent [19]

Stritzel

[11] Patent Number: 4,926,712
[45] Date of Patent: May 22, 1990

[54] WORM WHEEL AND METHOD OF HOBBING SAME

[75] Inventor: Gene A. Stritzel, Rochester, N.Y.
[73] Assignee: DK-Gleason, Inc., Rochester, N.Y.
[21] Appl. No.: 363,910
[22] PCT Filed: Oct. 15, 1986
[86] PCT No.: PCT/US86/02161
§ 371 Date: Oct. 15, 1986
§ 102(e) Date: Oct. 15, 1986
[87] PCT Pub. No.: WO88/02829
PCT Pub. Date: Apr. 21, 1988
[51] Int. Cl.$^5$ ............................................. F16H 00/00
[52] U.S. Cl. ....................................... 475/227; 74/458; 409/12
[58] Field of Search ............................ 74/710, 715, 458; 409/11, 12, 20

[56] References Cited

U.S. PATENT DOCUMENTS

| | | | |
|---|---|---|---|
| 2,277,041 | 3/1942 | Drummond | 409/33 |
| 2,631,475 | 3/1953 | Gleasman | 74/715 |
| 2,812,668 | 11/1957 | Holt | 74/458 |
| 2,821,865 | 2/1958 | Ufert | 74/458 |
| 2,837,010 | 6/1958 | Davenport | 409/15 |
| 2,891,450 | 6/1959 | Freudiger | 409/20 |
| 2,935,887 | 5/1960 | Wildhaber | 74/458 |
| 3,077,146 | 2/1963 | Ufert | 409/12 |
| 3,188,915 | 6/1965 | Hurth | 409/33 |
| 4,630,497 | 12/1986 | Nelson | 74/425 |
| 4,739,671 | 4/1988 | Nelson | 74/425 |

FOREIGN PATENT DOCUMENTS 8403743 9/1984 PCT Int'l Appl. .

OTHER PUBLICATIONS

International Institution for Production Engineering Research, Dictionary of Production Engineering, vol. 8, 1979, Verlag W. Girardet, (Essen, DE), see page 252, Nos. 83652, 83655.

Primary Examiner—Dwight G. Diehl
Attorney, Agent, or Firm—Stonebraker, Shepard & Stephens

[57] ABSTRACT

An hourglass worm wheel and method of hobbing same wherein the finished worm wheel (70) includes a mid zone (B) where the root surface and outside helix are cylindrical for a predetermined distance along the axis of the worm wheel. The method forming the mid zone includes a combination radial and axial feeding of a hobbing tool (58) rotating in synchronization with the rotating worm wheel blank (50).

33 Claims, 3 Drawing Sheets

WORM WHEEL AND METHOD OF HOBBING SAME

TECHNICAL FIELD

This invention relates to gear hobbing in general, and to a novel technique for hobbing an hourglass worm wheel in particular. The invention specifically relates to the use of a novel hobbing technique for the purpose of improving the performance of differential worm gear assemblies of the type shown in U.S. Pat. No. 2,859,641, granted Nov. 11, 1958 to Vernon E. Gleasman.

BACKGROUND

In contrast with conventional differential assemblies, the worm-type does not utilize a bevel gear arrangement. Rather, it includes worm (or helical) gears, coupled to each inner axle end as drive gears, together with so called balancing or transfer gears associated with each of the worm gears and in mesh with each other for transferring and dividing torque between the axle ends. The transfer gears, or combination gears as they are referred to herein, are mounted in pairs, and each combination gear of a pair rotates on an axis of rotation that is substantially parallel to a tangent of the envelope of an associated axle drive, or side gear. Each combination gear consists of a centrally located hourglass worm wheel portion flanked at either end by an integral spur gear portion.

This invention has particular applicability to the hobbing processes used to rough form or finish form hourglass worm wheels or hourglass worm wheel portions of combination gears such as are used in worm-type differential assemblies.

In the gear making art, it is a generally accepted practice to provide some degree of mismatch between mating gears in order to accommodate a range of manufacturing tolerances, mounting errors and tooth deflections under load. Tip relief, for example, is an arbitrary modification of tooth profile whereby a small amount of material is removed near the tip of a gear tooth. Crowning, where material is removed from a gear tooth in the lengthwise direction, is another example of conventional gear modifications. To provide tip relief or crowning, the finishing hob is given a slight modification in form.

The present invention concerns a novel technique for removing material from a specific type of gear, i.e., an hourglass worm wheel, to provide a predetermined degree of mismatch between the hourglass worm wheel and a mating helical gear for the purpose of improving overall gear performance. The term "hourglass" as used in connection with the present invention, refers generally to the trace of tooth root surfaces in a worm wheel blank, the outer diameter shape of which may be of the form of an hourglass or a cylinder.

Hourglass worm wheels are conventionally produced by what is known as the radial infeed, or plunge, cutting method. In this method, the rotating hob, which duplicates the tooth form of the helical gear that ultimately is to mesh with the worm wheel (except that the tooth height may be increased for clearance and the tooth thickness may be varied for backlash) is fed in a radial direction toward the axis of the rotating hourglass blank. When the proper depth of cut has been reached, the hob is withdrawn in a radially outward direction. This same procedure is used for both rough forming and finish forming operations, using the appropriate class of hob.

By way of additional background, helical gears are typically formed by passing the rotating hobbing tool axially along the face of the rotating blank in a direction parallel to the longitudinal axis of the blank.

In the past, the desired lengthwise mismatch between mating worm and worm wheel teeth was accomplished through the utilization of an oversize hob, selected in accordance with known formulas. It has been found, however, that when oversize hobs are used, i.e., a hob larger than the helical gear it represents, backlash (the amount by which the width of a tooth space exceeds the thickness of the engaging tooth on the operating pitch circle) is eliminated or rapidly taken up upon slight axial shifting of the worm wheel. Absent sufficient backlash under load, noise generating edge contacts and/or interferences are experienced, leading to premature surface deterioration.

In addition, it is also known that when oversize hobs are used to obtain a desired amount of lengthwise mismatch, subsequent sharpenings of the hob may either increase or decrease the amount of mismatch provided by the hob.

The present invention seeks not only to eliminate such problems which accompany prior art hobbing techniques, but also to improve the overall performance characteristics of worm-type differential assemblies.

DISCLOSURE OF INVENTION

Applicant has discovered that the performance of worm-type differential assemblies can be improved by combining conventional radial infeed and axial feed hobbing techniques in the formation of hourglass worm wheels used in such assemblies.

According to this invention, it is possible to provide the desired lengthwise mismatch between a worm wheel and a helical gear with which it is designed to be meshed, while maintaining sufficient backlash under load, so that noise generating edge contacts and/or interferences are minimized.

Specifically, the hobbing cycle according to one aspect of the invention includes plunging, or radially infeeding, the rotating hob from one side of the rotating worm wheel blank toward the longitudinal axis of the blank at a point slightly offset from its lengthwise or axial mid-point. After the desired depth of cut is achieved, the hob is fed axially in the direction of the longitudinal axis of the blank to form an axial cut zone of predetermined length. The hob is subsequently withdrawn in a radially outward direction.

The length of the axial cut zone is critical. It has been found that if the length is too great, the worm wheel and mating helical gear take on the rolling characteristics of cross-axis helical gears, i.e., the contact pattern of the meshing gears remains in the central portion of the axial cut zone so that gear wear is concentrated in a narrow area. This arrangement produces localized overstressed areas which will eventually cause pitting or even spalling of the contacting gear surfaces.

In the present invention, the axial feed of the hob is limited to the extent that, under load, the zone of tooth contact extends into the curved, or hourglass-shaped portions of the gear on either side of the axial feed zone.

It will be appreciated that if the radial infeed occurs at other than an end point of the desired axial motion, then the axial motion of the hob may be bi-directional so as to achieve the desired full extent of the axial motion.

It is also within the scope of this invention to unbalance the amount of mismatch between tooth ends by varying the amount of axial feed on either side of the axial center, or tooth center point, of the worm wheel. It is believed that the effect of such an imbalance would be to vary the thrust loads and friction effects in a worm-type differential under conditions of forward and reverse rotation of the differential. For example, in the forward direction of rotation of a worm-type differential, the combination gears tend to shift slightly along their respective axes toward one wall of the gear case window in which they are mounted. This slight shifting may tend to displace the contact pattern on the worm wheels to one side of their respective centers. In the reverse mode of operation, the same gears may be shifted against the opposite window wall, resulting in contact being displaced to the other side of the tooth center position. Therefore, axially feeding the hob different lengths on either side of the axial center position of a worm wheel would provide different operating characteristics associated with tooth contact which is shifted to either side of the center position. It is understood that even in the unbalanced mode, the tooth contact extends to the curved portions on both sides of the axial feed zone, but with a larger portion of the contact zone on one side than on the other.

In summary, the theory behind the new hobbing cycle is that the critically sized axial cut zone of the worm wheel teeth produces a generated involute helicoidal tooth form which remains more conjugate in normal section with its mating helical gear over a range of displacements in its mounted position. At the same time, the axial cut zone provides the desired lengthwise mismatch between the worm wheel and helical gear at tooth ends so as to permit greater axial displacement of the worm wheel under load without substantial loss of backlash and without occurrences of undesirable interferences and edge contacts which occur with worm wheel and helical gear sets formed in the conventional manner.

Details of the present invention will be apparent from the accompanying drawings and detailed description of a presently preferred exemplary embodiment which follow.

DETAILED DESCRIPTION OF THE DRAWINGS

Figure 1:
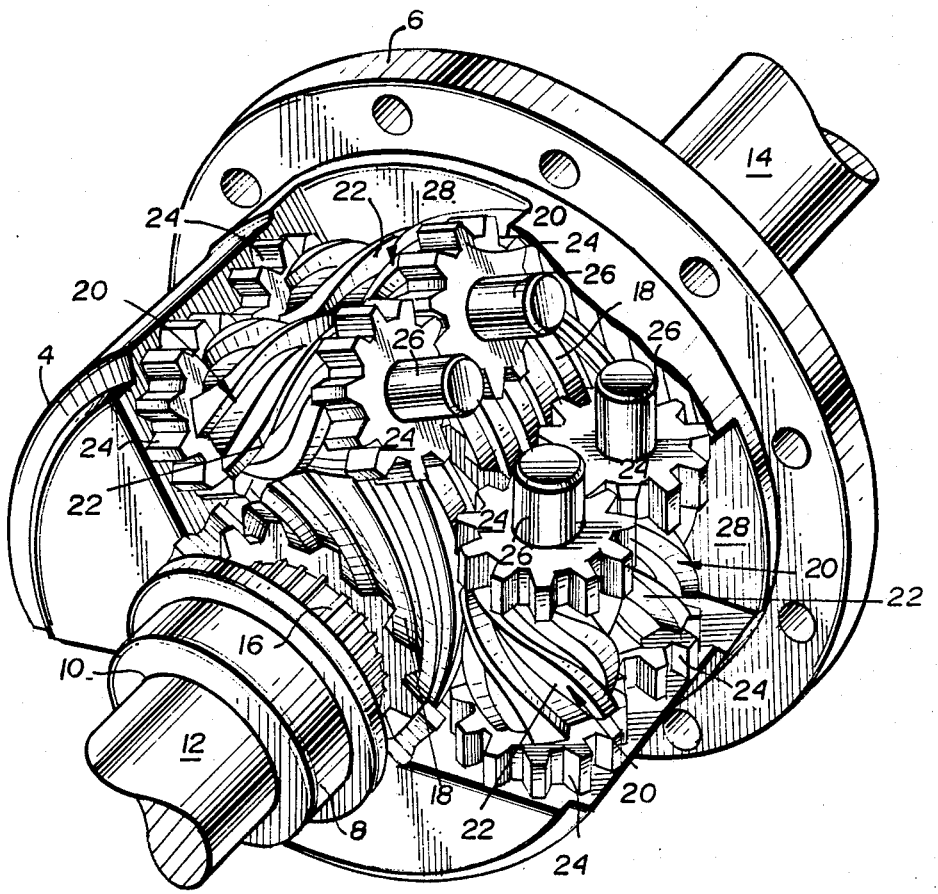
FIG. 1 is a perspective view of a known type of differential gear assembly, with parts broken away in section to show the internal gear structure.

Referring to FIG. 1, the known worm-type differential assembly includes a differential case 4 provided with a flange 6 to which a ring gear (not shown) is suitably attached. The ring gear receives power input from the drive train of a vehicle in a conventional manner. The differential case 4 also includes a pair of spaced apart trunions 8 (only one of which is shown) which are adapted to receive bearings (not shown) by which the differential case is rotatably mounted inside a conventional differential or axle housing (not shown).

The differential case 4 also includes a pair of axle receiving bores 10 which are at least partially defined by the trunions 8 and through which axle shaft ends 12, 14 extend into engagement with the differential gear assembly inside the case. In particular, each axle shaft end includes external splines 16 which engage mating internal splines of helical worm, or side, gear 18.

Each side gear 18 meshes with three balancing or transfer gears 20 which are arranged at 120° intervals about the periphery of the side gear, and which are arranged generally tangentially to, and engaged with, the pitch surface of the side gear. It is understood with reference to FIG. 1, that only two of the three transfer gears associated with each side gear 18 are shown. These transfer gears, which are hereinafter referred to as combination gears, are formed with a middle portion which constitutes an hourglass worm wheel portion 22 and integral end portions which constitute spur gear portions 24. It can be seen that each side gear 18 meshes with worm wheel portions of three associated combination gears 20. At the same time, the spur gear portions 24 of each combination gear associated with one side gear mesh with the spur gear portions of adjacent combination gears associated with the other of the two side gears. It is this arrangement, sometimes termed a "cross-axis compound planetary gear complex" which transfers and divides torque between axle shaft ends 12, 14. Each combination gear 20 is mounted for rotation about a shaft 26, the ends of which extend beyond the gear and serve to mount the gear within the gear case 4. It can be seen that each side gear 18 meshes with worm wheel portions 22 of a set of three associated combination gears 20. At the same time, the spur gear portions 24 of each combination gear associated with one side gear meshes with the spur gear portions of adjacent combination gears associated with the other of the two side gears. Thus, as clearly illustrated in FIG. 1, each of the three combination gears 20 associated with one side gear 18 is paired with a combination gear associated with the other side gear. To accommodate each combination gear pair, the case 4 is formed with three peripherally arranged "windows" or slots 28 (only partially shown in FIG. 1) extending radially inwardly from the periphery of the case 4, each window or slot 28 receiving one pair of combination gears.

Figure 2:
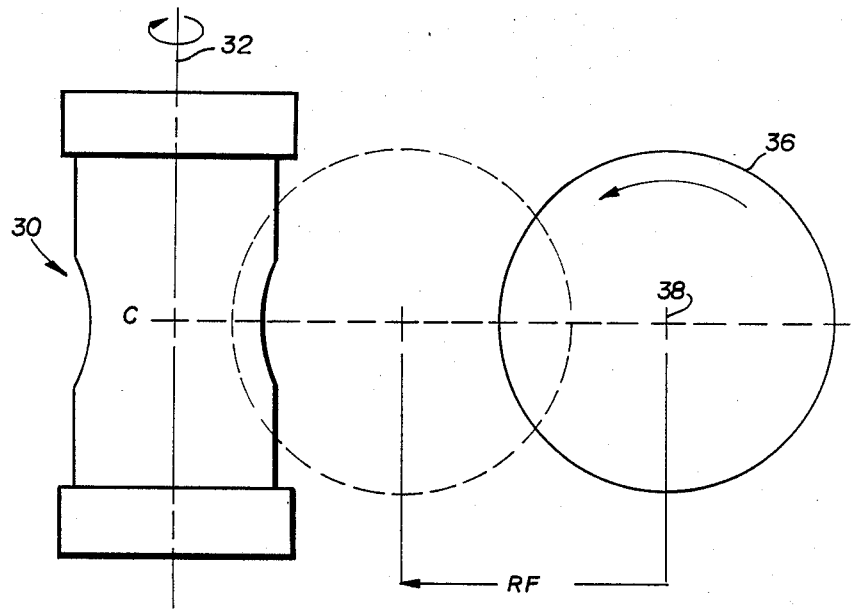
FIGS. 2 and 3 are schematic diagrams illustrating prior art hobbing machine cycles for forming and/or finishing hourglass worm wheels and cylindrical helical gears.

FIG. 2 shows, in schematic form, the conventional hobbing machine cycle for rough forming and/or finishing the teeth on an hourglass worm wheel blank. The blank 30, which in this case is for a combination gear having a centrally located hourglass worm wheel portion and spur gear portions at either end thereof, is mounted for rotation about a vertical axis 32. A hobbing tool 36, which has substantially the same tooth form as the helical worm, or side gear that the combination gear will ultimately mesh with in the the differential assembly, is moved radially inwardly along a straight path RF toward the center of the blank while rotating about a horizontal axis 38. It is understood that rotation of the hobbing tool and blank are synchronized through gearing in a manner well understood in the gear making art.

After the hobbing tool has rough formed or finish formed the worm wheel teeth via radial infeed a predetermined distance, the tool is dwelled for a predetermined number of revolutions and is then radially outwardly withdrawn along the same path.

Figure 3:
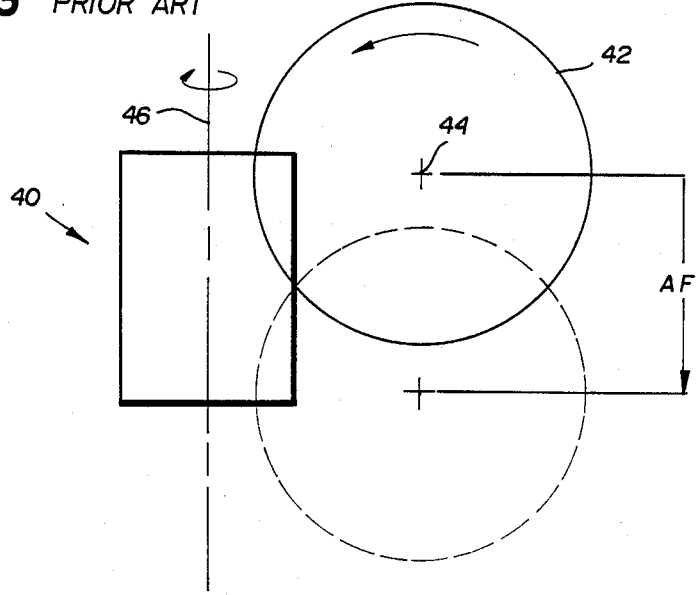

Referring now to FIG. 3, there is shown a conventional hobbing machine cycle for rough or finish forming teeth on a cylindrical helical gear. A helical gear blank 40 is shown mounted for rotation about vertical axis 46. A hobbing tool 42 is shown mounted for rotation about a horizontal axis 44. The hobbing tool is fed axially along a path AF parallel to the axis 46 of the helical gear blank until the hob passes across the entire face of the gear blank. As in the hobbing cycle illustrated in FIG. 3, rotation of the gear blank and hob is synchronized. In addition, a supplemental relative motion is provided between the axial feed of the hobbing tool and the rotation of the gear blank to form gear teeth in the blank at the desired helix angle.

Figure 4:
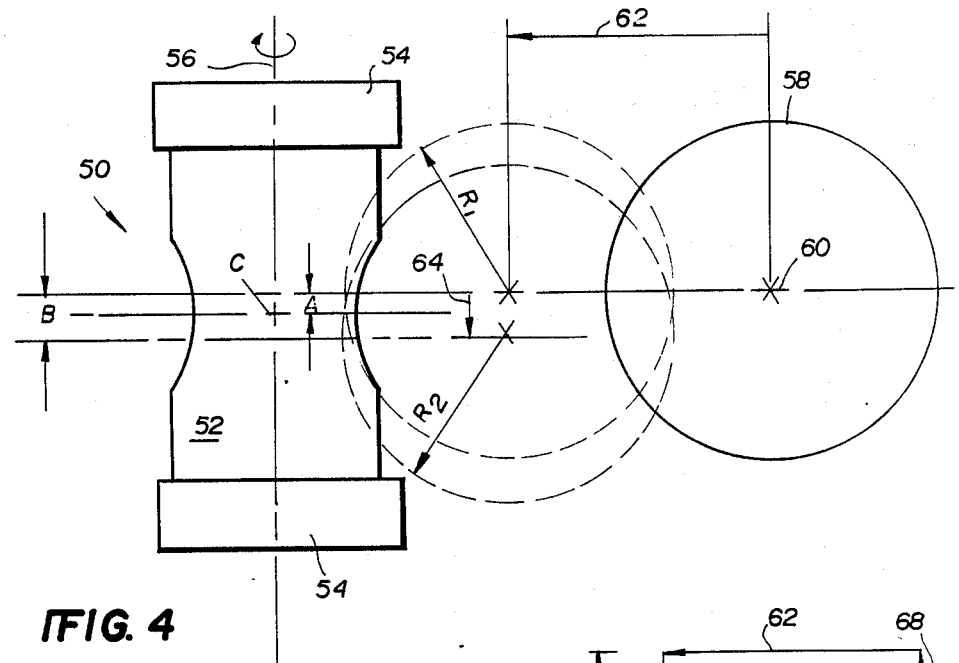
FIG. 4 is a schematic diagram of the hourglass worm wheel hobbing process of an exemplary embodiment of this invention.
Figure 5:
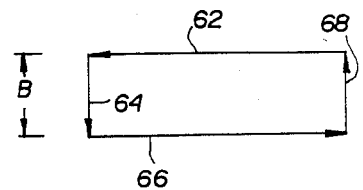
FIG. 5 is a schematic diagram illustrating the paths of travel of the hobbing tool in accordance with an exemplary embodiment of this invention.

Referring now to FIGS. 4 and 5, a hobbing machine cycle according to an exemplary embodiment of this invention is illustrated schematically. Combination gear blank 50, having a centrally located hourglass worm wheel portion 52 and spur gear portions 54, is shown mounted for rotation about a vertical axis 56. A hobbing tool 58, having substantially the same tooth form as the helical side gear 18 is mounted for rotation about a horizontal axis 60 and for radial infeed along a path 62. The hob 58 is smaller than the typical oversized hob normally used to obtain a desired amount of mismatch. The hob 58 may be the same size as the mating helical gear it represents, or slightly larger for purposes of achieving desired clearance and backlash. The path 62, unlike the conventional radial infeed, is offset from the axial center or mid-point C of the worm wheel portion (C also represents the center point of a worm wheel tooth) by a slight amount designated "A" in the drawings, and further described below. Once the hob tool 58 has reached its predetermined infeed position, at which point the gear teeth are substantially but not completely rough or finish formed, the tool is directed axially in a direction parallel to the axis 56 along a path 64 to create a substantially cylindrical axial cut zone designated "B" which spans the axial center C. The cut zone B forms a substantially cylindrical mid zone on the worm wheel. In a timed relationship with the axial movement of the hob tool, a supplemental relative rotation is imparted to the worm wheel to follow the desired helix angle of the worm wheel. The net effect of the described hob tool movement is to create curved sections on the hourglass worm wheel, defined by radii $R_1$, $R_2$, on either side of a cylindrical middle portion defined by the axial dimension B. As indicated in FIG. 5, the hob tool is then moved radially outwardly away from the gear along a path 66. For a similar operation on a following gear blank, the hob may be returned to its starting position along a path 68. It is thus seen that the hob may follow an essentially rectangular path during a complete hobbing cycle in this exemplary embodiment. As will be appreciated, alternate paths may be devised which produce the same ultimate result (e.g., a radial infeed along the mid point followed by bi-directional axial feeds along path 64).

For one particular hourglass worm wheel typically utilized in a worm-type differential as disclosed in U.S. Pat. No. 2,859,641, it has been discovered that the preferred length B of the axial cut zone on the worm wheel portion of the gear is between about 0.030 inches (0.762 mm) and 0.040 inches (1.016 mm) but less than about 0.050 inches (1.270 mm). Therefore, the dimension A, representing the amount of offset between the hob tool infeed path and the axial center C of the worm wheel portion is equal to the dimension B/2, or about 0.015–0.025 inches (0.381–0.635 mm), and preferably about 0.015–0.020 inches (0.381–0.508 mm). This ensures that the axial cut zone is located centrally of the worm wheel portion of the blank.

Figure 6:
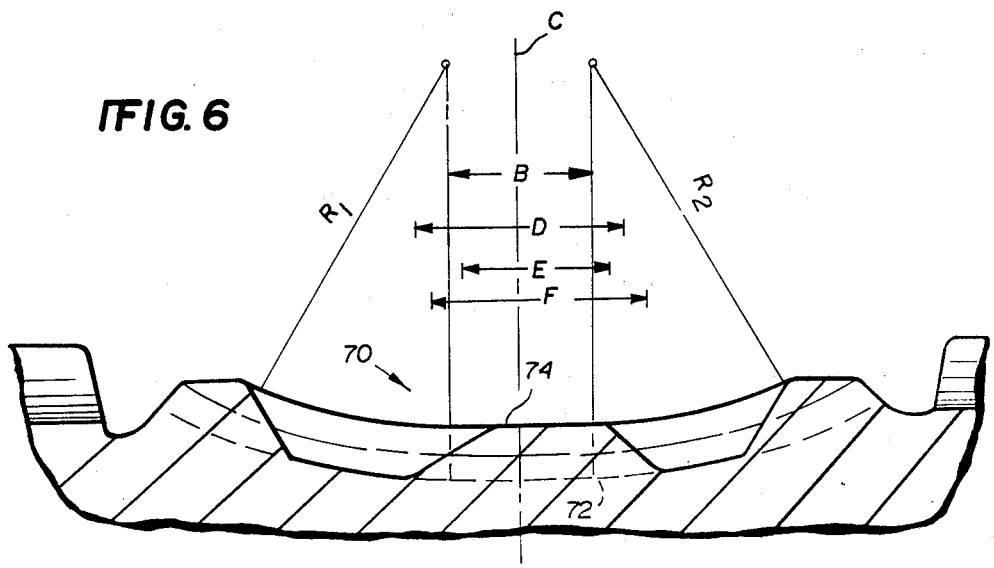
FIG. 6 is a cross-sectional view of an hourglass worm wheel formed according to the present invention, showing the cylindrical mid-portion of the wheel in exaggerated form.

An exaggerated depiction of the axial cut zone formed in accordance with the hobbing machine cycle described hereinabove is shown in FIG. 6. Viewing the rough or finish formed combination gear in partial cross-section, it can be seen that the hourglass worm wheel portion has formed thereon a tooth surface area 70. Centrally disposed therealong between curved portions defined by radii $R_1$, $R_2$ is an axial cut zone B wherein both the root surface 72 and outside helix surface 74 are flat. Outside the cut zone B the root surface increases in diameter from opposite ends thereof. It is to be understood that, for any given hourglass worm wheel, the significant criteria for establishing the length of the axial feed zone is that, under load, tooth contact between the mating helical gear and worm wheel teeth extends beyond the length of the axial feed zone. With reference to FIG. 6, the contact zone will extend approximately equally on either side of the zone B, as illustrated, for example, by dimension D.

In those instances discussed hereinabove, where it is desired to create imbalance in the amount of mismatch by varying the amount of axial feed on one side or the other of the axial center of the worm wheel or gear tooth center point to form an unbalanced axial cut zone, as shown in FIG. 6 by reference letter E, a similarly unbalanced contact zone as indicated, for example, by reference letter F will result.

In each case, the axial feed zone represents a generated involute helicoidal tooth form which is more conjugate with a mating side gear 18 in a worm-type differential as disclosed in FIG. 1.

In addition, the increased lengthwise mismatch provided by the axial cut zone permits greater axial displacement of the combination gears under load without substantial loss of necessary backlash, and without occurrences of undesirable interferences and tooth edge contacts. Thus, an improved worm-type differential is provided with enhanced performance characteristics.

It is to be understood of course that a combination of the known oversize hob technique and the axial feed technique of this invention may be employed to obtain lengthwise mismatch, depending on whether or not it is desired to maintain a constant backlash over a wide range of axial shifting. If it is so desired, then the axial feed technique should be employed. However, if it is not objectionable for backlash to be taken up or eliminated after some degree of axial shift, then the oversize hob technique may be used in combination with the axial feed technique of this invention. In other words, backlash over a range of axial displacements may be controlled by the manner in which lengthwise mismatch is obtained. In this regard, for a given amount of backlash, as the diameter of the oversize hob becomes smaller, the amount of axial feed required becomes larger, and vice versa.

Moreover, it is apparent that the axial feed technique of this invention may be utilized to keep mismatch constant where sharpening of an oversize hob otherwise results in an increase or decrease in mismatch. For example, if mismatch is decreased as a result of hob sharpenings, an increased amount of feed will compensate and provide the desired mismatch.

While the novel hobbing machine cycle of this invention has been disclosed in conjunction with its application to gears utilized in a specific worm-type differential gear assembly, it should be understood that this novel hobbing cycle may provide similar beneficial results in any worm wheel/helical gear set. Moreover, it will be apparent to those skilled in the art that various changes may be made to the basic concepts disclosed herein which would nevertheless remain within the scope of the invention as defined by the claims which follow.

What is claimed:

1. An hourglass worm wheel having a longitudinal axis, a generally hourglass-shaped root surface and at least one gear tooth formed thereon, said root surface increasing in diameter from opposite ends of a mid zone which is substantially cylindrical and which cylindrical mid zone extends over a predetermined axial distance.

2. A hourglass worm wheel as defined in claim 1 wherein each gear tooth formed thereon has an outside helix surface, a central region of which, in cross section, substantially corresponds to the mid zone formed in the root surface.

3. An hourglass worm wheel as defined in claim 1, wherein the mid zone is at least about 0.030 inches (0.762 mm) but less than about 0.050 inches (1.270 mm) in length as measured along the longitudinal axis of the worm wheel.

4. An hourglass worm wheel as defined in claim 3, wherein the mid zone is about 0.030 inches (0.762 mm) to 0.040 inches (1.016 mm) in length as measured along the longitudinal axis of the worm wheel.

5. A gear set comprising:
    (a) an hourglass worm wheel having an axial center lying on a longitudinal axis, and
    (b) a mating helical gear,
  wherein,
    the hourglass worm wheel is formed with a root surface which increases in diameter from opposite ends of a cylindrical portion formed by an axial cut zone of predetermined dimensions spanning the axial center thereof.

6. A gear set as defined in claim 5, wherein said axial cut zone is at least about 0.030 inches (0.762 mm) but less than about 0.050 inches (1.270 mm) in axial length.

7. A gear set as defined in claim 5, wherein said axial cut zone is about 0.030 inches (0.762 mm) to 0.040 inches (1.016 mm) in axial length.

8. A gear set as defined in claim 5, wherein teeth of the hourglass worm wheel and mating helical gear mesh in a contact zone which, under load, extends beyond either side of the axial cut zone.

9. A gear set as defined in claim 8, wherein said axial cut zone extends approximately equally on either side of said axial center of said worm wheel.

10. A gear set as defined in claim 8, wherein said axial cut zone extends a greater distance on one side of said axial center of said worm wheel than on the other side thereof.

11. In a combination gear comprising an elongated axially extending body formed with a centrally located elongated hourglass worm wheel portion, and spur gear portions integrally formed at either end thereof, and wherein said elongated worm wheel portion is adapted for meshing engagement with a mating helical gear, the improvement comprising:

a cylindrical root surface and outside helix in an axial cut zone located along the length of the hourglass worm wheel portion, said root surface increasing in diameter from opposite ends of said axial cut zone toward the spur gear portion.

12. A combination gear as defined in claim 11, wherein the cylindrical root surface in the axial cut zone extends at least about 0.030 inches (0.762 mm) but less than about 0.050 inches (1.270 mm) in axial length.

13. A combination gear as defined in claim 11, wherein the cylindrical root surface in the axial cut zone extends between about 0.030 inches (0.762 mm) and 0.040 inches (1.016 mm) in axial length.

14. A combination gear as defined in claim 11, wherein said axial cut zone has a length such that when said hourglass worm wheel portion is in meshing engagement with said mating helical gear under load, a contact zone is established therebetween which extends beyond the axial cut zone.

15. In a vehicle differential assembly of the type which includes a differential case having means for receiving a pair of axle ends together with a pair of side gears coupled to said pair of axle ends for rotation therewith, at least two pairs of combination gears associated with said side gears and rotatably carried by said differential case and arranged such that for each pair, one combination gear of a pair associated with one of said side gears meshes with a second combination gear of the pair associated with the other of said side gears, said first pair of combination gears meshing together via spur gears, each of said combination gears including an hourglass worm wheel portion having an axial center, and provided at either end thereof with spur gear portions, the worm wheel portion being formed with an outside helix and root surface which are of substantially hourglass shape, the improvement comprising:

a cylindrical root surface and outside helix in an axial cut zone of predetermined dimensions located along the length of the worm wheel portion, and spanning said axial center.

16. The differential assembly of claim 15, wherein the axial cut zone is at least about 0.030 inches (0.762 mm) but less than about 0.050 inches (1.270 mm) in axial length.

17. The differential assembly of claim 15, wherein the hourglass worm wheel portion of each combination gear meshes with an associated side gear in a contact zone which, under load, extends beyond both sides of said axial cut zone.

18. The differential assembly of claim 17, wherein said axial cut zone extends approximately equally on either side of said axial center.

19. The differential assembly of claim 17, wherein said axial cut zone extends a greater distance on one side of said axial center than on the other side of said axial center.

20. A method of providing lengthwise mismatch between an hourglass worm wheel and a mating cylindrical worm gear without substantial loss of backlash comprising the steps of:
    (a) radially inwardly feeding a finish hobbing tool having a gear tooth form substantially the same as that of the mating cylindrical worm gear toward the radial center of a rough formed hourglass worm wheel;
    (b) while in the radially inward position, axially feeding the finish hobbing tool a predetermined distance in a direction parallel to the longitudinal axis of the hourglass worm wheel to form an axial cut zone spanning an axial center of said worm wheel; and (c) withdrawing the finish hobbing tool radially outwardly away from the hourglass worm wheel.

21. A method as defined in claim 20, wherein in step (b), the finish hobbing tool is axially fed a distance of between at least about 0.030 inches (0.762 mm) but less than about 0.050 inches (1.270 mm).

22. A method as defined in claim 20, wherein in step (b), the finish hobbing tool is axially fed a distance of between about 0.030 inches (0.762 mm) and 0.040 inches (1.016 mm).

23. A method as defined in claim 20, wherein said predetermined distance is such that the hourglass worm wheel and mating cylindrical worm gear mesh in a contact zone which extends beyond both sides of axial cut zone.

24. A method as defined in claim 23, wherein in step (b) said hobbing tool is axially fed an equal distance on either side of said axial center of said worm wheel.

25. A method as defined in claim 23, wherein in step (b), said hobbing tool is axially fed a greater distance on one side of said axial center of said worm wheel than on the other side of said axial center.

26. A method of hobbing an hourglass worm wheel comprising the steps of:

(a) mounting an elongated worm wheel blank for rotation about its longitudinal axis, said worm wheel blank having radial and axial centers;

(b) providing a cylindrical hobbing tool rotatable about an axis perpendicular to the axis of rotation of the blank;

(c) rotating the worm wheel blank and the hobbing tool in synchronized relationship;

(d) plunge cutting the blank by radially inwardly feeding the hobbing tool toward the radial center of the blank;

(e) while in its radially innermost position axially feeding the hobbing tool in a direction parallel to the longitudinal axis of the blank to form an axial cut zone spanning the axial center of said worm wheel; and (f) withdrawing the hobbing tool radially outwardly away from the blank.

27. A method of hobbing an hourglass worm wheel as defined in claim 26, wherein, in step (d), the hobbing tool is offset from the axial center of the blank a distance of at least about 0.015 inches (0.381 mm) but not more than about 0.025 inches (0.635 mm).

28. A method of hobbing an hourglass worm wheel as defined in claim 26, wherein, in step (d), the hobbing tool is offset from the axial center of the blank a distance of between about 0.015 (0.381 mm) and 0.020 (0.508 mm) inches.

29. A method of hobbing an hourglass worm wheel as defined in claim 27, wherein, in step (e), the hobbing tool is axially fed a distance of at least about 0.030 inches (0.762 mm) but less than about 0.050 inches (1.270 mm).

30. A method of hobbing an hourglass worm wheel as defined in claim 28, wherein, in step (e), the hobbing tool is axially fed a distance of between about 0.030 inches (0.762 mm) and 0.040 inches (1.016 mm).

31. A method of hobbing an hourglass worm wheel as defined in claim 26, wherein, in step (e), the hobbing tool is fed equal distances on either side of said axial center of said worm wheel.

32. A method of hobbing an hourglass worm wheel as defined in claim 26, wherein, in step (e), the hobbing tool is fed a greater distance on one side of said axial center of said worm wheel than on the other side thereof.

33. A method of hobbing an hourglass worm wheel as defined in claim 26, wherein the hobbing tool is of a size larger than a helical gear it is designed to represent by an amount chosen in conjunction with an amount of axial feed practiced in step (e) such that a predetermined amount of lengthwise mismatch between teeth of said helical gear and teeth of said worm wheel is obtained.

* * * * *